United States Patent
Kula et al.

(10) Patent No.: US 11,279,878 B2
(45) Date of Patent: Mar. 22, 2022

(54) BIREFRINGENT LIQUID CRYSTAL COMPOSITION COMPRISING ALKYLSULFANYLARYL ISOTHIOCYANATO TOLANE COMPOUNDS

(71) Applicants: Essilor International, Charenton-le-Pont (FR); Nikon Corporation, Minato-ku (JP)

(72) Inventors: Przemyslaw Kula, Warsaw (PL); Jakub Herman, Warsaw (PL)

(73) Assignees: Essilor International, Charenton-le-Pont (FR); Nikon Corporation, Minato-ku (JP)

( * ) Notice: Subject to any disclaimer, the term of this patent is extended or adjusted under 35 U.S.C. 154(b) by 58 days.

(21) Appl. No.: 16/063,925

(22) PCT Filed: Dec. 21, 2015

(86) PCT No.: PCT/IB2015/002606
§ 371 (c)(1),
(2) Date: Jun. 19, 2018

(87) PCT Pub. No.: WO2017/109534
PCT Pub. Date: Jun. 29, 2017

(65) Prior Publication Data
US 2018/0371317 A1    Dec. 27, 2018

(51) Int. Cl.
*G02F 1/1333* (2006.01)
*C09K 19/18* (2006.01)
*C09K 19/12* (2006.01)

(52) U.S. Cl.
CPC ............. *C09K 19/18* (2013.01); *C09K 19/12* (2013.01); *C09K 2019/122* (2013.01); *C09K 2019/123* (2013.01); *C09K 2019/181* (2013.01); *C09K 2019/183* (2013.01); *C09K 2019/188* (2013.01)

(58) Field of Classification Search
CPC .. C09K 19/18; C09K 19/12; C09K 2019/122; C09K 2019/123; C09K 2019/181; C09K 2019/183; C09K 2019/188; G02F 1/1333
USPC .................................................... 252/299.6
See application file for complete search history.

(56) References Cited

U.S. PATENT DOCUMENTS

2018/0371317 A1* 12/2018 Kula ................... C09K 19/18

FOREIGN PATENT DOCUMENTS

| JP | 2002-3844 A | 1/2002 |
| JP | 2002-12871 A | 1/2002 |
| JP | 2013-237842 A | 11/2013 |
| WO | WO 92/16519 | 10/1992 |
| WO | WO 2014/094973 A1 | 6/2014 |

OTHER PUBLICATIONS

Carmen Otilia Catanescu, Shin-Tson Wu & Liang-Chy Chien Corresponding author (2004) Tailoring the physical properties of some high birefringence isothiocyanato-based liquid crystals, Liquid Crystals, 31:4, 541-555, DOI: 10.1080/02678290410001662240.*
International Search Report dated Sep. 22, 2016, in PCT/IB2015/002606, filed Dec. 21, 2015.
Catanescu, C. et al., "High Birefringence Nematic Liquid Crystals for Display and Telecom Applications", Molecular Crystals and Liquid Crystals, vol. 411, No. 1, 2004, pp. 93-102.
Cross, G. J. et al., "Synthesis, transition temperatures, and optical properties of compounds with simple phenyl units linked by double bond, triple bond, ester or propiolate linkages", Journal of Materials Chemistry, vol. 10, No. 7, 2000, pp. 1555-1563.
Office Action dated Oct. 30, 2019 in Japanese Patent Application No. 2018-532599 (with English translation), 8 pgs.
Carmen O. Catanescu, et al.; "Tailoring the Physical Properties of Some High Birefringence Isothiocyanato-Based Liquid Crystals"; Accepted Nov. 18, 2003; Published Online: May 12, 2010; Abstract Only, 2 pgs.
Office Action dated Mar. 26, 2020 in Europe Patent Application No. 15 834 798.9-1105; 5 pgs.

* cited by examiner

*Primary Examiner* — Geraldina Visconti
(74) *Attorney, Agent, or Firm* — Oblon, McClelland, Maier & Neustadt, L.L.P.

(57) ABSTRACT

The present invention relates to an optical article comprising a birefringent liquid crystal composition, said composition comprising more than 30% by weight based on the total weight of the composition of tolane compounds of formula R—S—$Z^1$-A-$Z^2$—NCS, in which R is a substituted or unsubstituted, linear or branched alkyl group, $Z^1$ and $Z^2$ are aryl groups, and A is an ethynyl group, an arylethynyl group or an ethynylarylethynyl group.

19 Claims, 8 Drawing Sheets

Figure 1:
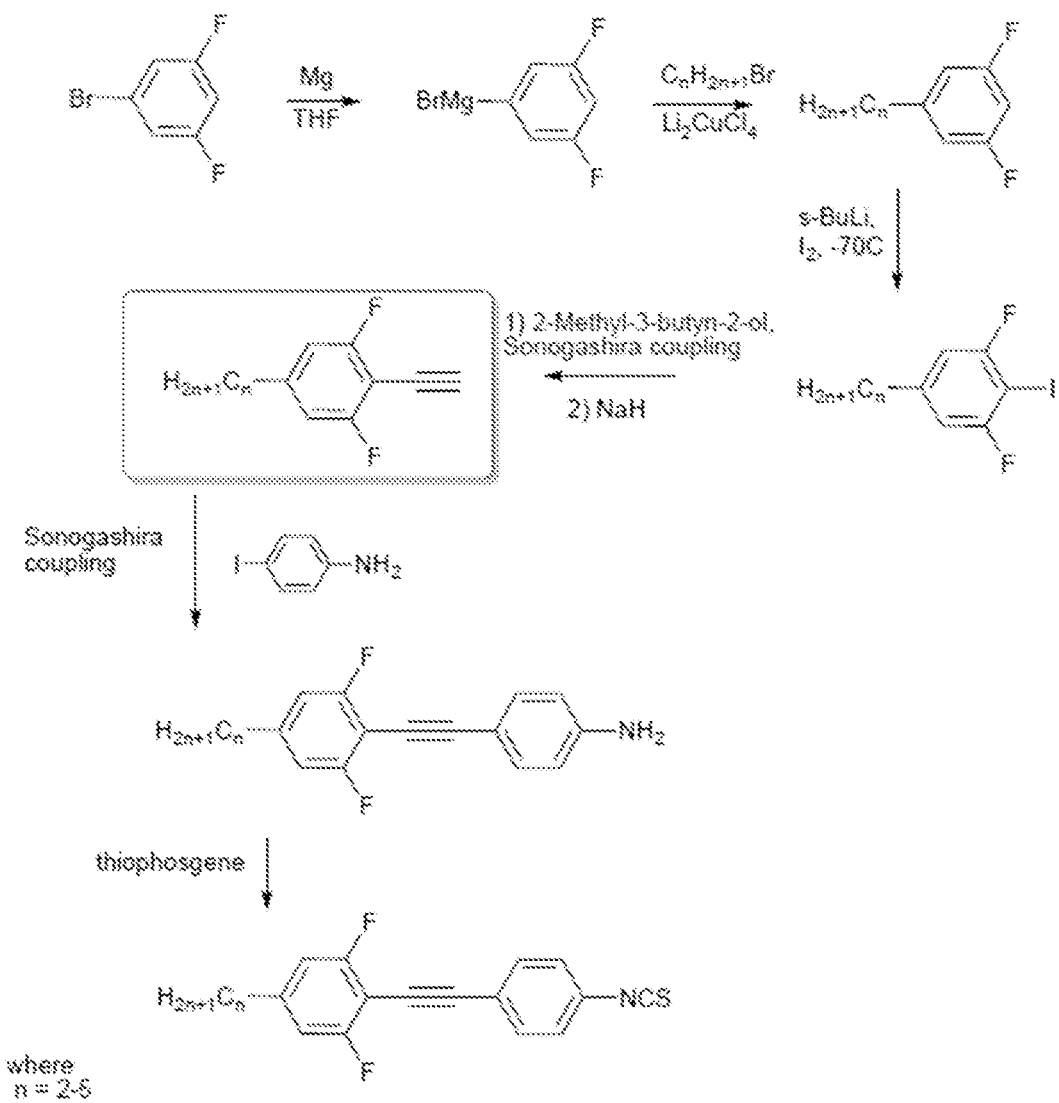

BIREFRINGENT LIQUID CRYSTAL COMPOSITION COMPRISING ALKYLSULFANYLARYL ISOTHIOCYANATO TOLANE COMPOUNDS

The invention relates to an optical article comprising a birefringent composition that is in nematic liquid crystal state at room temperature.

Almost all the liquid crystal (LC) devices, such as display panels, liquid crystal lenses, spatial light modulators, and optical phased arrays for laser beam steering require a fast response time. In order to achieve fast response time, a straightforward approach is to use liquid crystal mixtures having a high birefringence (Δn) in the visible spectral region, typically greater than 0.3, and relatively low viscosity. Birefringent compositions are also particularly attractive for reflective displays employing cholesteric and polymer-dispersed liquid crystals. Those exhibiting nematic phases are particularly suitable for these applications.

The most effective way to increase birefringence is to elongate the π-electron conjugation length of the liquid crystal compounds, for example by adding phenyl rings to the molecular core. However, the use of too many phenyl rings results in some undesirable properties, such as a too high melting point and a limited solubility of the corresponding compound in the liquid crystal formulation, a dramatic increase of the viscosity. Further, the birefringence gradually saturates once there are more than three phenyl rings in the molecule.

Isothiocyanatotolanes and arylisothiocyanatotolanes liquid crystalline compounds have attracted a lot of interest because of their high birefringence resulting from extended electron conjugation through the linear core of the molecule and the highly polar terminal isothiocyanate group (NCS).

European patent application EP 1054001 describes liquid crystal media and displays comprising isothiocyanatotolane derivatives having the formula shown hereunder, wherein R is an alkyl group, one of $Z^1$ and $Z^2$ is —C≡C— and the other is —C≡C— or a single bond, and $X^1$ to $X^{10}$ are each independently H or F:

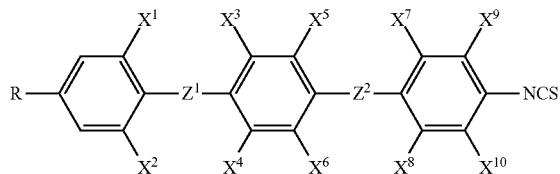

The disclosed birefringence at 589 nm and 20° C. for these compounds is lower than 0.45.

The publication "Isothiocyanato-Tolanes Based High Birefringence and Fast Response Time Mixtures for Photonic Applications", Mol. Cryst. Liq. Cryst., Vol. 453, pp. 215-226, 2006 to S. Gauza et al. discloses high birefringence nematic mixtures (Δn~0.3 at 633 nm) comprising isothiocyanatotolanes.

Another mixture comprising fluoro-substituted alkyltolane and alkylphenyl tolane isothiocyanate compounds has been reported to have a birefringence of 0.42 at 589 nm in "Highly birefringent, low-loss liquid crystals for terahertz applications", APL Mat. 1, 012107 (2013) to B. M. Fischer et al.

High melting temperature, poor solubility, increased viscosity and degraded thermal stability are the major concerns for birefringent liquid crystals.

It is therefore an aim of the present invention to formulate novel liquid crystal compositions with high birefringence values in the visible spectrum, which exhibit broad nematic mesophase ranges enabling the use of the composition over a wide ambient temperature range, show satisfactory solubility, viscosity and stability, and do not exhibit the disadvantages mentioned above.

The present inventors have found that the use of tolane compounds having an alkylsulfanylaryl group and an arylisothiocyanate group allowed to simultaneously increase the level of birefringence of formulations of liquid crystal compounds and the miscibility/solubility of the heavier structures included in the formulation, and report for the first time the preparation of stable nematic mixtures having a birefringence Δn≥0.45 at 30° C. and 589 nm.

To address the needs of the present invention and to remedy to the mentioned drawbacks of the prior art, the applicant provides an optical article comprising a birefringent liquid crystal composition, said composition comprising more than 30% by weight based on the total weight of the composition of compounds of formula (I):

$$R—S—Z^1-A-Z^2—NCS \qquad (I)$$

wherein R is a substituted or unsubstituted, linear or branched alkyl group, $Z^1$ and $Z^2$ are aryl groups, and A is an ethynyl group, an arylethynyl group or an ethynylarylethynyl group.

Figure 2:
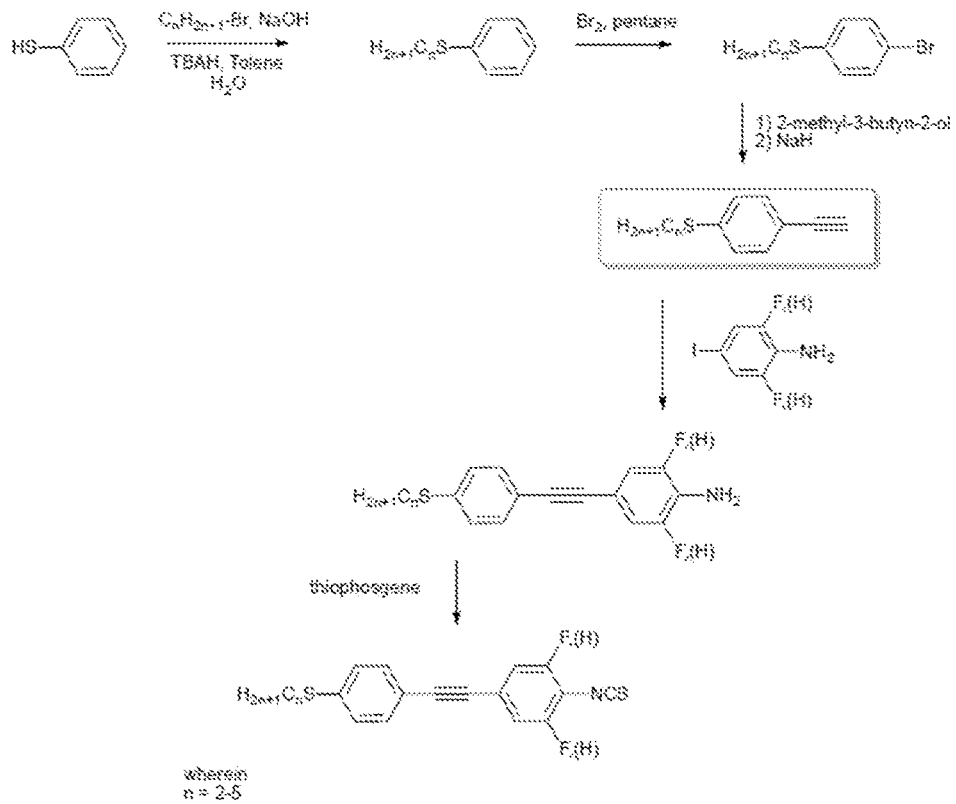
Figure 3:
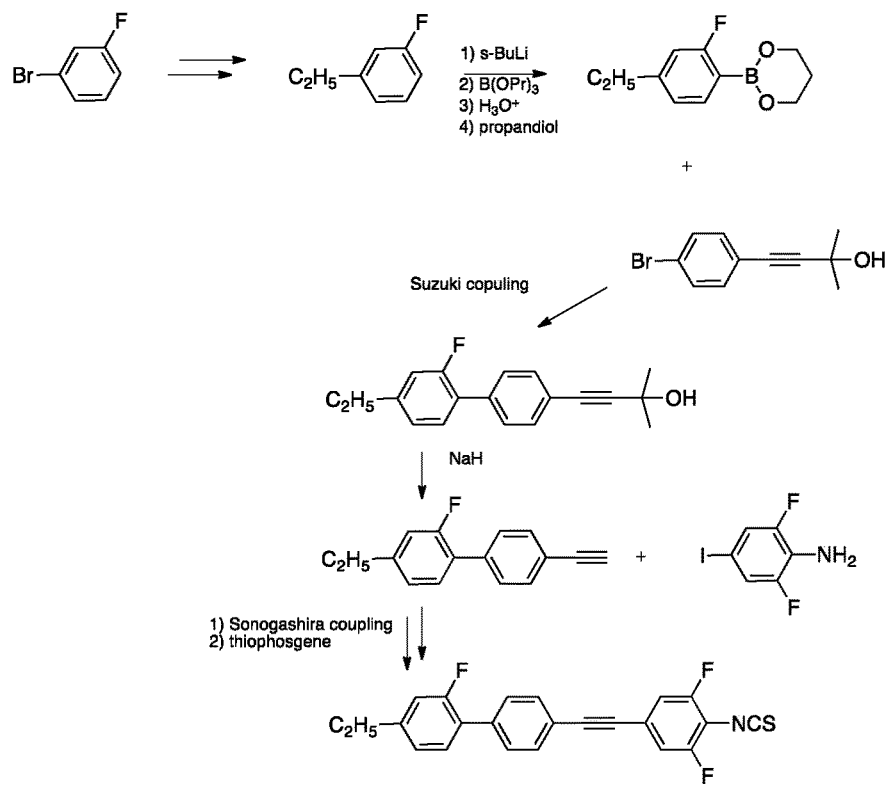
Figure 4:
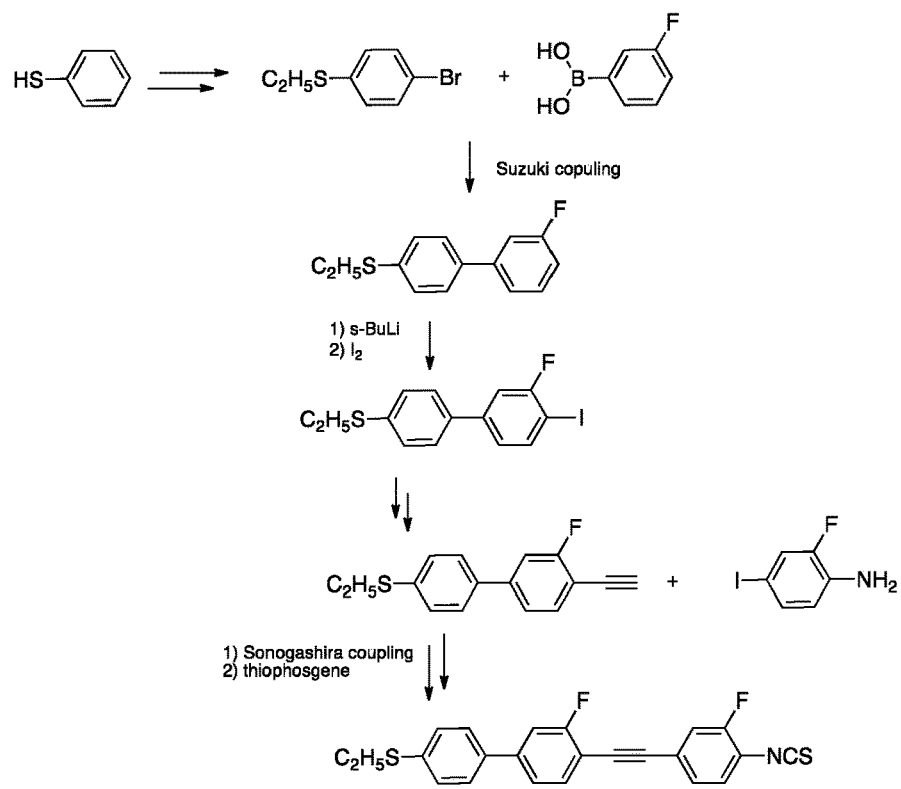
Figure 5:
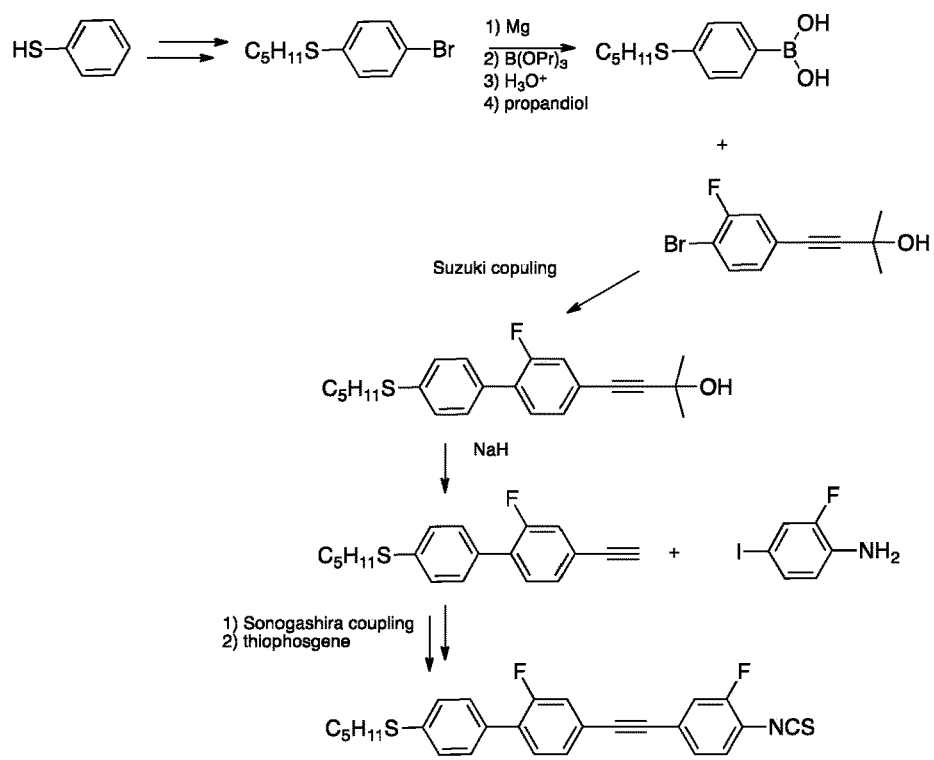
Figure 6:
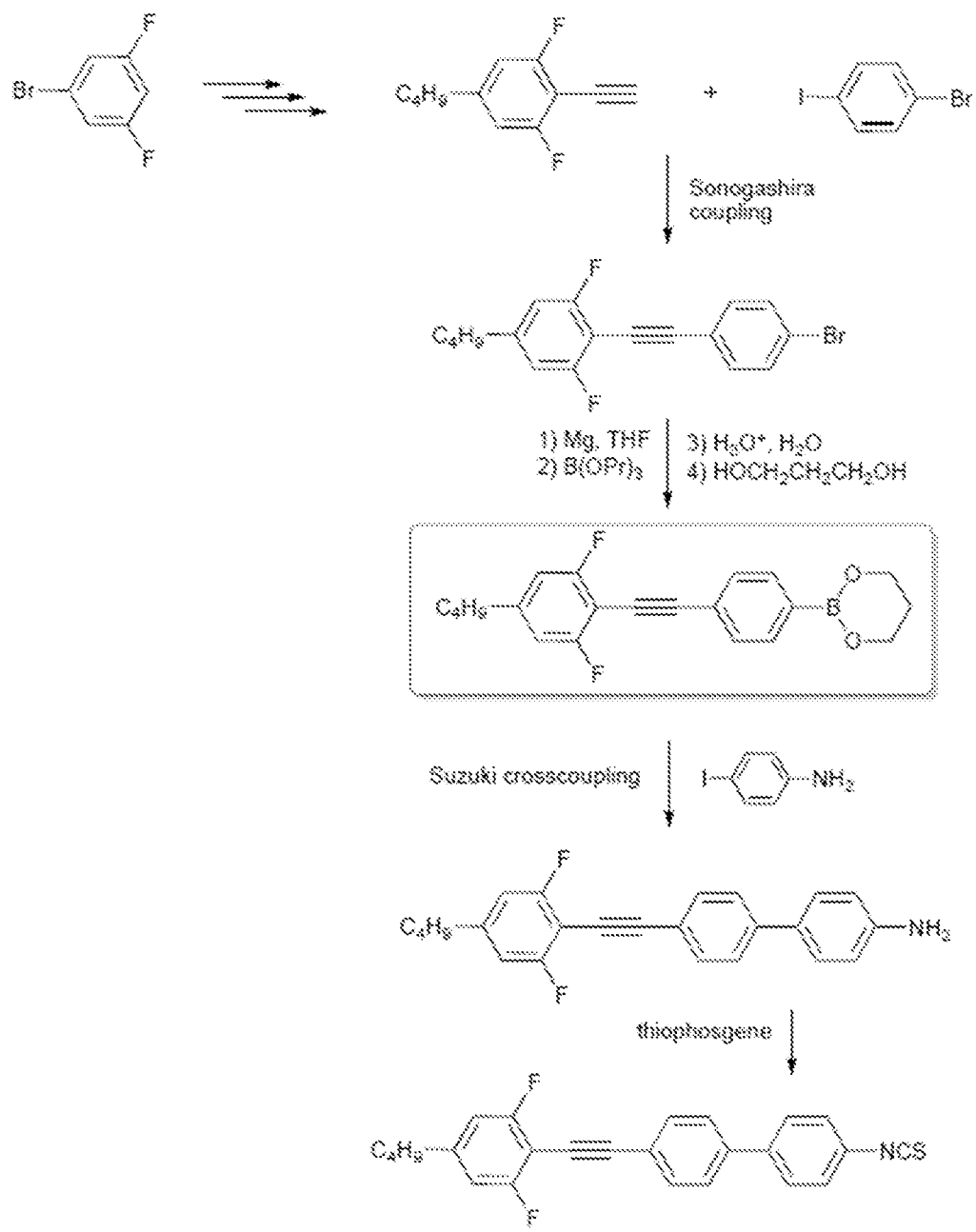
Figure 7:
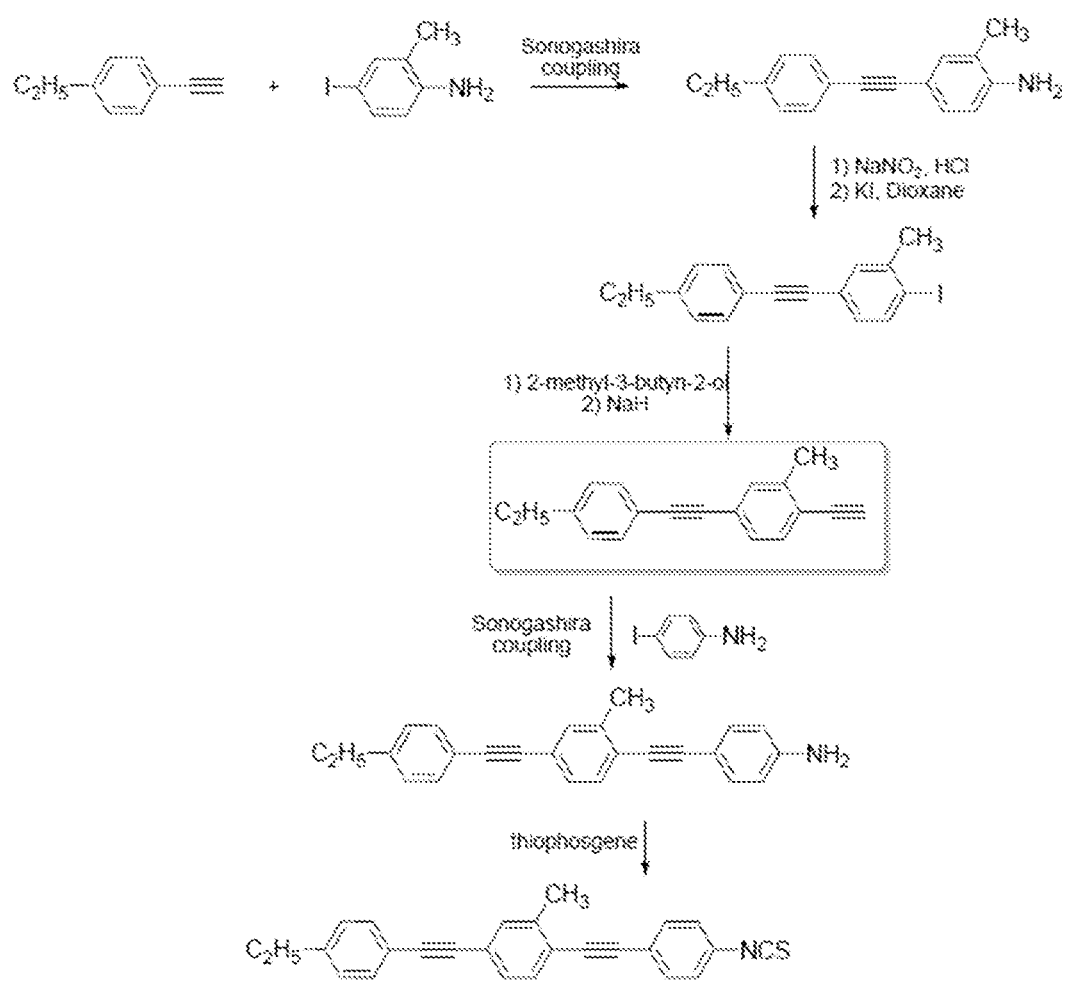
Figure 8:
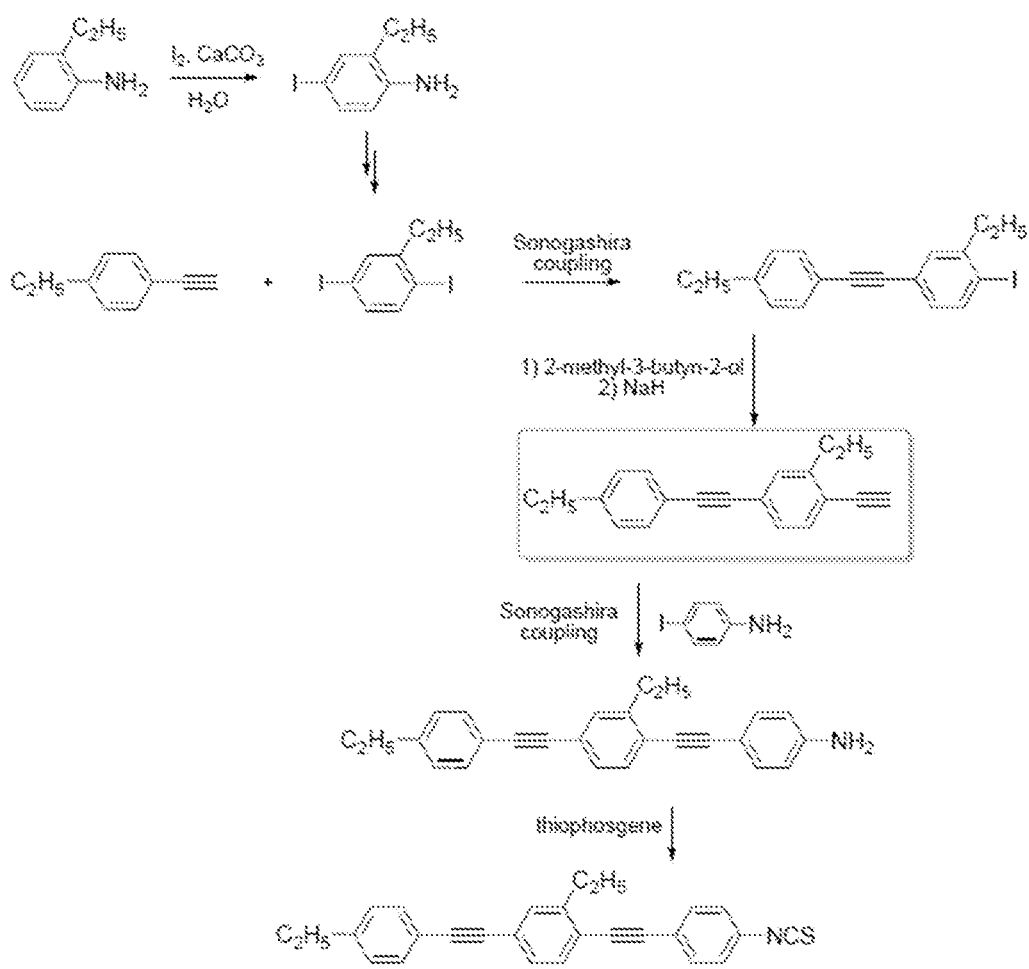
Figure 9:
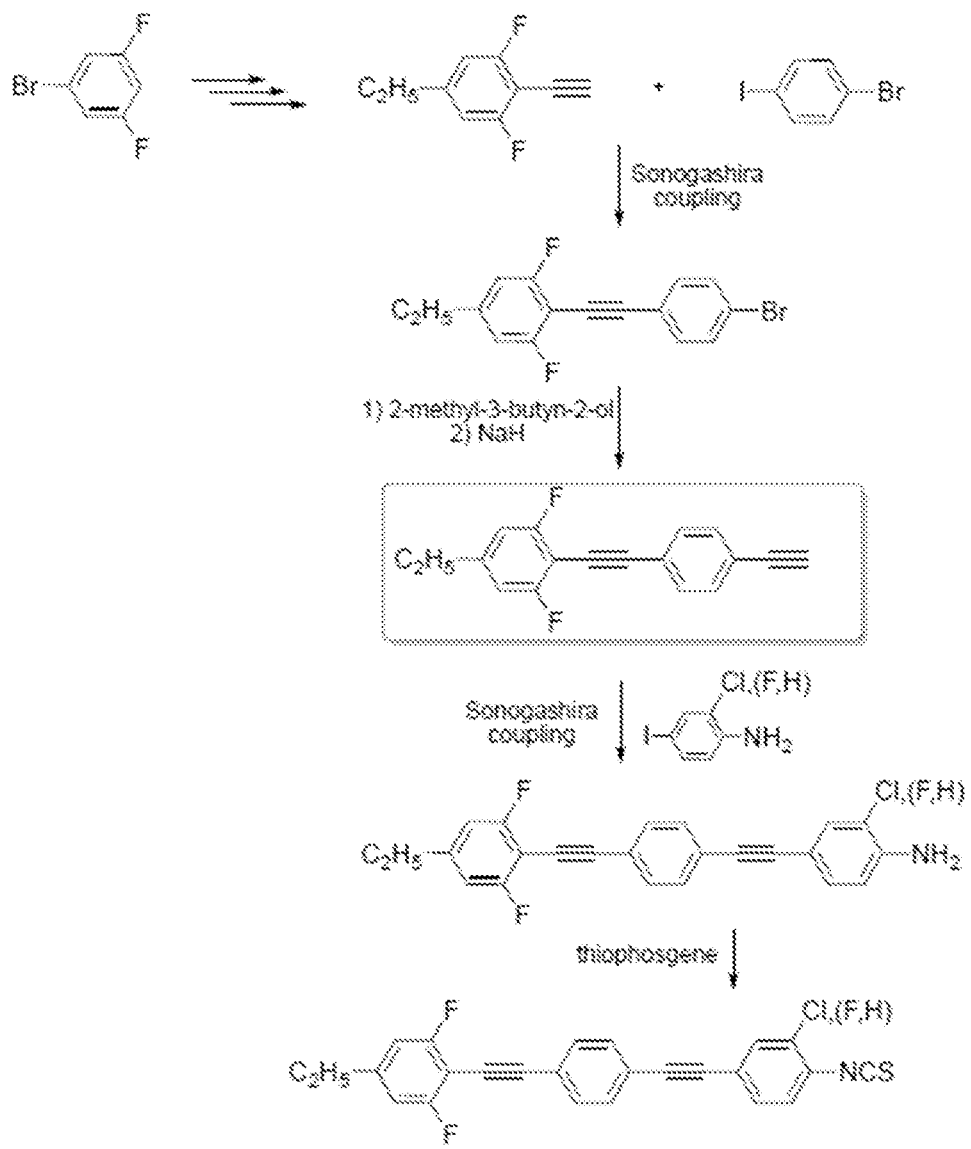
Figure 10:
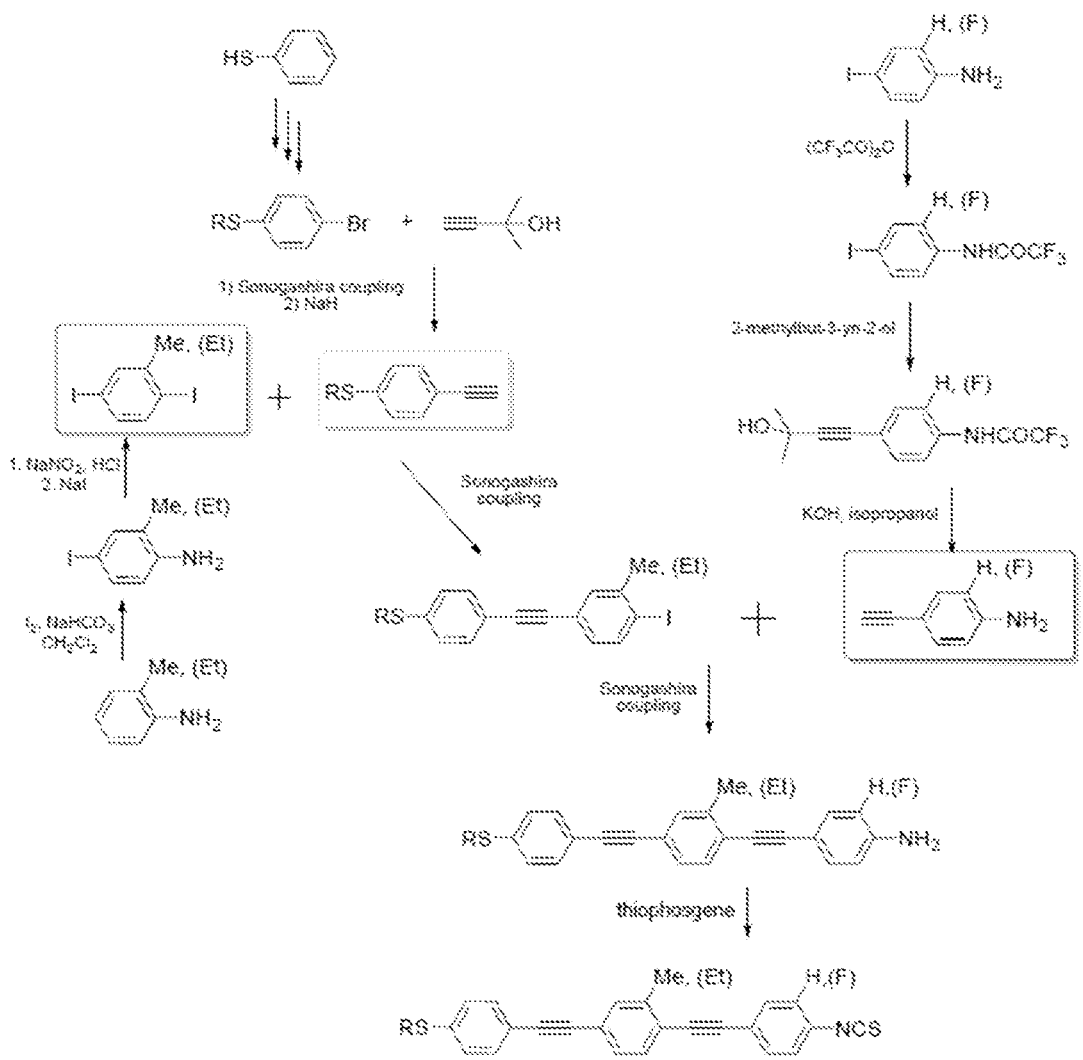
Figure 11:
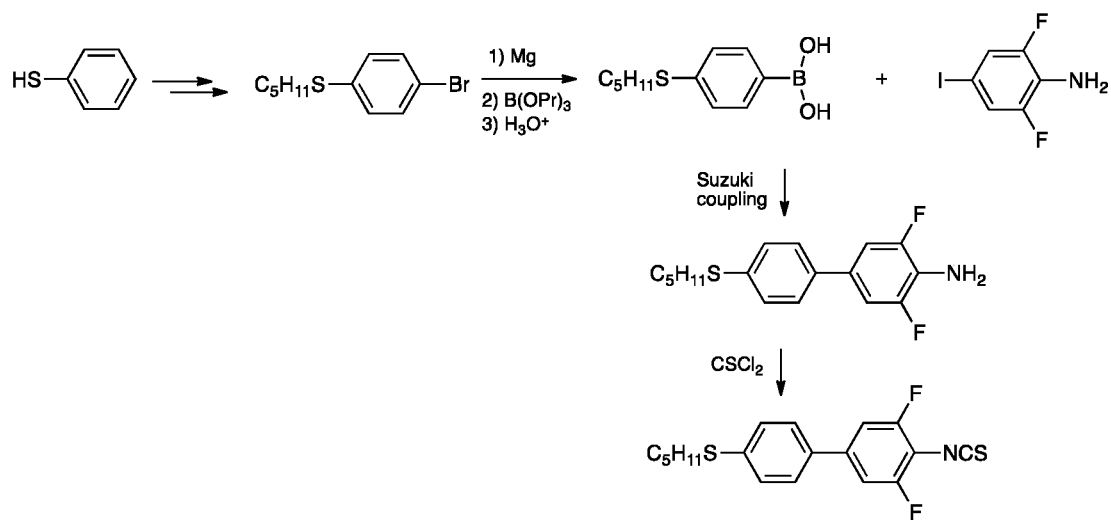

The present invention will be described in more detail by referring to the appended drawings, wherein:

FIG. 1 illustrates the preparation of compounds of formula (II) according to the invention, FIG. 2 illustrates the preparation of compounds of formula (III) according to the invention, FIG. 3 illustrates the preparation of compounds of formula (Va) according to the invention, FIGS. 4-5 illustrate the preparation of compounds of formula (Vb) according to the invention, FIG. 6 illustrates the preparation of compounds of formula (VI) according to the invention, FIGS. 7-9 illustrate the preparation of compounds of formula (VIIa) according to the invention, FIG. 10 illustrates the preparation of compounds of formula (VIIb) according to the invention, FIG. 11 illustrates the preparation of compounds of formula (VIII) according to the invention.

The composition according to the invention is a liquid crystal composition, which means that it is in a liquid crystal state around room temperature (10° C.-30° C.). This does not mean that all of its individual components are necessarily liquid crystal compounds. Specifically, said composition presents a nematic phase around room temperature. In the following, one understands by "liquid crystal phase" a phase in which the liquid crystals (mesogens) are ordered, by opposition to an isotropic phase in which the liquid crystals are in the isotropic state, and by "nematic" a common liquid crystal phase, in which the molecules have no positional order, but they have long-range orientational order.

Compounds of formula (I) are tolane compounds, i.e., compounds incorporating a tolane group. As used herein, a tolane group represents an $Ar^1$—C≡C—$Ar^2$ group having identical or different aryl groups $Ar^1$ and $Ar^2$ substituted or unsubstituted. This rigid arrangement of structural blocks prevents deep twisting of rings and assures perfect conjugation of π-electron system.

A is a divalent group chosen from ethynyl, arylethynyl and ethynylarylethynyl groups. When A represents an arylethynyl or ethynylarylethynyl group, such groups are preferably connected to $Z^1$ and $Z^2$ by a para substitution scheme. In other words, the arylethynyl group is preferably a 4-arylethynyl group, and the ethynylarylethynyl group is preferably a 4-ethynylarylethynyl group. Such groups can be connected in any order to $Z^1$ and $Z^2$. For example, the arylethynyl group can be connected to $Z^1$ through the aryl group and to $Z^2$ through the ethynyl group, or else can be connected to $Z^2$ through the aryl group and to $Z^1$ through the ethynyl group.

When A represents an ethynylarylethynyl group, tolane compounds (I) are bis-tolane compounds (triaryl diacetylenes). As used herein, a bis-tolane group is a tolane group of formula $Ar^1$—C≡C—$Ar^3$—C≡C—$Ar^2$ having identical or different aryl groups $Ar^1$ and $Ar^2$, an arylene group $Ar^3$, substituted or unsubstituted, and two triple bonds preferably in para position on the central aryl ring $Ar^3$.

The substituted or unsubstituted, linear or branched alkyl group R comprises generally from 1 to 8 carbon atoms, preferably from 1 to 6 carbon atoms, more preferably from 2 to 5 carbon atoms. It is preferably a C1-C6 linear alkyl group, more preferably a C2-C5 linear alkyl group, for example an ethyl, n-propyl, n-butyl or n-pentyl group. The inventors observed that decreasing the number of carbon atoms in the terminal alkylsulfanyl chain led to a birefringence increase. However, short alkyl terminated compounds also generally show higher temperatures of melting than longer alkyl homologues. Therefore, there must be found a proper balance between birefringence increase and decrease of the phase transition temperature. All alkyl groups mentioned in the present application are preferably identical or different C1-C6 linear alkyl groups.

Non-limiting examples of substituents for linear or alkyl group R are halogen atoms such as fluorine, chlorine and bromine, preferably fluorine, alkylsulfanyl groups, alkenyl, alkenyloxy, hydroxyl, thiol, amino, nitro, aryloxy, monoalkylamino, dialkylamino, acyl, carboxyl, alkoxycarbonyl, aryloxycarbonyl, hydroxysulfonyl, alkoxysulfonyl, aryloxysulfonyl, alkylsulfonyl, alkylsulfinyl, cyano, $OCF_3$, $OCHF_2$, tetrazolyl, carbamoyl, alkylcarbamoyl and dialkylcarbamoyl.

Said composition preferably comprises from 45 to 60% by weight of compounds of structure (I), based on the composition total weight.

The present birefringent composition generally comprises a plurality of compounds, preferably compounds having an arylisothiocyanate group and especially tolane compounds having an arylisothiocyanate group, as diversified structures, i.e., molecules with different shapes and lengths, are necessary for ensuring a proper miscibility level. Indeed, using a large number of different molecular structures helps to stabilize the nematic phase at temperatures close to or below room temperature. Less complex mixtures may suffer from the small number of combined structural elements, and undergo precipitation at low temperatures. The present composition preferably comprises 2 to 25 different compounds, more preferably 5 to 20, and even more preferably 8 to 20. As mentioned previously, said compounds preferably have an arylisothiocyanate group and more preferably are tolane compounds having an arylisothiocyanate group.

It has been observed that the isothiocyanate —NCS group brought the largest contribution to the birefringence increase. Therefore, compounds having an isothiocyanate group generally represent more than 90% of the composition total weight, more preferably more than 95% by weight and ideally 100% by weight. It is generally a terminal isothiocyanate group, which is preferably borne by an aromatic group.

All weights % are expressed relative to the total weight of the composition, unless otherwise specified.

Preferably, compounds having a tolane group represent more than 90% of the composition total weight, more preferably more than 95% by weight. Preferably, compounds having a bis-tolane group represent 5-40% of the composition total weight, more preferably 10-35% by weight.

In some aspects, the present invention provides a birefringent composition in which 25-45% of the weight is represented by compounds having a 4-aryl-tolane group bearing an isothiocyanate group, preferably 25-41% by weight.

In a preferred embodiment, 40-70%, more preferably 45-60% by weight of the composition is represented by compounds having a (terminal) alkylsulfanylaryl group. The inventors discovered that insertion of a more polarizable sulfur atom into the alkyl chain of an arylalkyl group in tolane compounds led to a significant birefringence increase. In other words, alkylsulfanylaryl groups provide a higher birefringence than the corresponding alkoxyaryl and alkylaryl groups in the tolane series. Compounds having an alkylsulfanylaryl group also have the advantage to exhibit low melting temperatures.

Alkylsulfanylaryl group containing compounds (I) preferably comprise 20-30% by weight of 4'-alkylsulfanyl-4-isothiocyanatotolanes (III). In another embodiment, compounds (I) comprise 10-20% by weight of 4'-(4"-alkylsulfanylaryl)-4-isothiocyanatotolanes (Vb). In a further embodiment, compounds (I) comprise 5-20% by weight of 4'-(4"-alkylsulfanylarylethynyl)-4-isothiocyanatotolanes (VIIb), preferably 6-17%. Preferably, compounds (I) comprise 20-30 by weight of compounds (III), 10-20% by weight of compounds (Vb), and 5-20% by weight of compounds (VIIb).

The birefringent composition according to the invention preferably comprises 25-50% by weight of mono-tolane compounds of formula Y—$Ar^4$—C≡C—$Ar^5$—NCS (II-III), in which Y represents an alkylsulfanyl R—S group or an alkyl group R, R being such as defined hereabove, $Ar^4$ and $Ar^5$ are identical or different arylene groups, substituted or unsubstituted, the Y and NCS substituents being in para position relative to the triple bond.

Compounds (II-III) show a medium birefringence, i.e., a birefringence generally ranging from 0.3 to less than 0.5 at 589 nm and 30° C. Without wishing to be bound by any theory, it is believed that these compounds favor low melting temperatures of the composition and secure good solubility and miscibility of high birefringent components, i.e. components having a birefringence $\Delta n \geq 0.5$, preferably $\geq 0.6$. Indeed, structures with the longest π-electron conjugation, such as bis-tolane compounds, and especially those having sulfur atoms in their chain, significantly increase the birefringence level but have a lower level of solubility than shorter tolane compounds. Compounds (II-III) are smaller molecules, and preferably have a melting temperature (phase transition temperature to isotropic liquid) lower than or equal to 100° C., more preferably lower than or equal to 90° C. and ideally lower than or equal to 80° C.

In one embodiment, the composition according to the invention comprises 10-20% by weight of 4'-alkyl-4-isothiocyanatotolanes (II). In another embodiment, the composition according to the invention comprises 20-30% by weight of 4'-alkylsulfanyl-4-isothiocyanatotolanes (III), preferably 20-28% by weight.

The composition preferably comprises 25-50% by weight of compounds (II) and (III), more preferably 30-45% by weight. These compounds generally fail to display liquid crystal properties.

Preferred compounds of formulae (II) and (III) are shown below. They can be obtained in a few synthetic steps from readily available precursors, as shown on FIG. 1 for compounds (II) and FIG. 2 for compounds (III). The first one starting from top has a melting point of 58° C., the fourth one 81.3° C., the fifth one 74.6° C. and the last one 56.6° C.

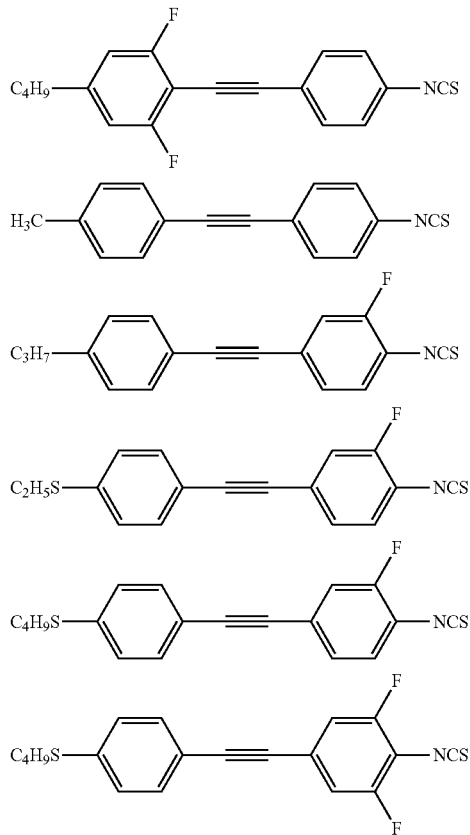

Other compounds of formulae (II) and (III) that may be used in the invention are shown below. Their respective melting temperatures are, from left to right and top to bottom 90° C., 79.1° C., 94.8° C., 104.7° C., 93.8° C., 73.6° C., 83.8° C., 86.2° C., 47.8° C., 78.7° C., 91.3° C., and 52.2° C.:

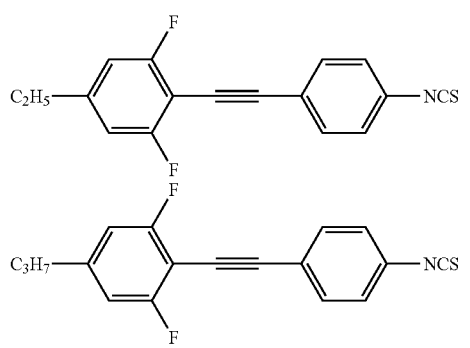

-continued

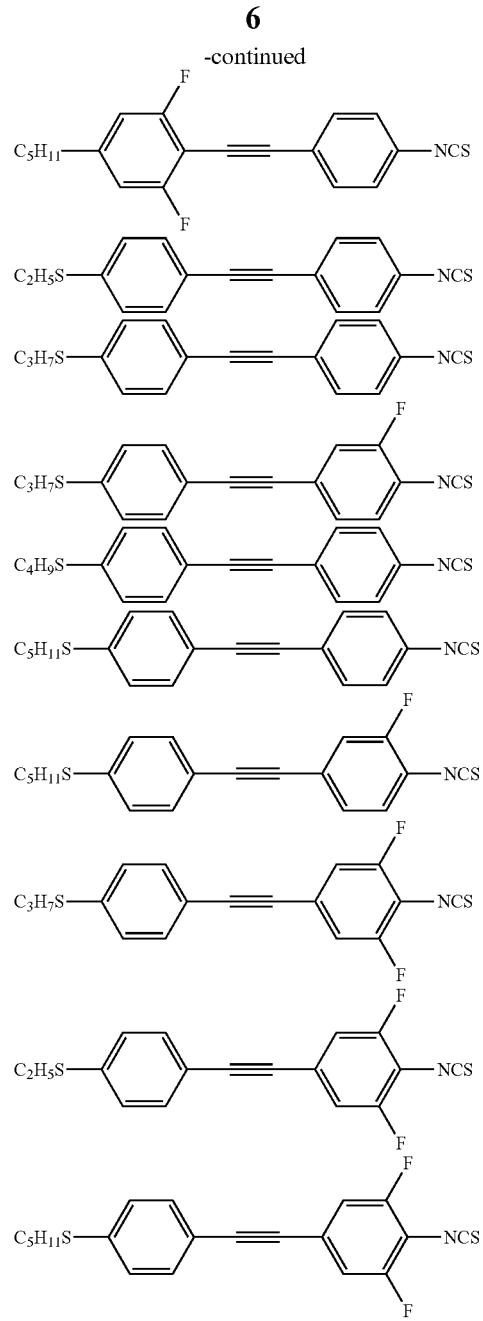

The composition preferably comprises 1-10% by weight of 4"-alkyl-4-isothiocyanatoterphenyls (IV), more preferably 1.5-6% by weight. Because of their extremely low melting enthalpy and different molecular shape with adjacent aromatic rings, such terphenyl compounds ensure high miscibility and solubility of composition. The preferred compound of formula (IV) is the following compound:

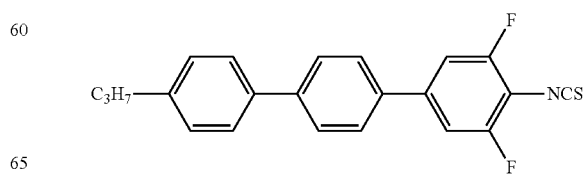

The composition preferably comprises 20-35% by weight of 4'-aryl-4-isothiocyanatotolanes (V), preferably 20-32% by weight. In another embodiment, the composition comprises 3-20% by weight of 4'-(4"-isothiocyanatoaryl)-4-alkyltolanes (VI), preferably 3-18% by weight.

4'-aryl-4-isothiocyanatotolanes (V) preferably comprise 5-20% by weight of 4'-(4"-alkylaryl)-4-isothiocyanatotolanes (Va), based on the total weight of the composition, more preferably 5-18%. In another embodiment, compounds (V) comprise 10-20% by weight of 4'-(4"-alkylsulfanylaryl)-4-isothiocyanatotolanes (Vb), preferably 11-18% by weight.

Mono-tolane compounds (V) and (VI) are aryltolane compounds having liquid crystal properties. As compared to compounds of formulae (II) and (III), they contain an additional aryl ring in the rigid core, resulting in increased birefringence. In the present composition, 15 to 45 by weight is represented by compounds having an aryltolane group, more preferably 20 to 40 by weight. As used herein, an aryltolane group represents an $Ar^1$—$Ar^3$—C≡C—$Ar^2$ group having identical or different aryl groups $Ar^1$ and $Ar^2$, an arylene group $Ar^a$, substituted or unsubstituted.

Preferred compounds of formulae (V) and (VI) are represented hereunder. The first one starting from top has a crystalline-nematic phase transition temperature of 99.8° C. and the third one 91.6° C.

Compounds of formula (V) can be obtained in a few synthetic steps from readily available precursors, as shown on FIGS. 3-6. FIG. 3 is directed to the synthesis of compounds (Va), FIGS. 4-5 are directed to the synthesis of compounds (Vb), while FIG. 6 is directed to the synthesis of compounds (VI).

In some embodiments, the composition comprises 8-45% by weight of bis-tolanes compounds, preferably 10-40% by weight, more preferably 10-35% by weight, even more preferably 12-35% by weight. Bis-tolane compounds are liquid crystals having three benzene rings separated by two carbon-carbon triple bonds and ensure one of the highest π-electron conjugations found so far in hydrocarbon based cores and therefore enable high birefringence. The preferred bis-tolanes compounds are 4'-arylethynyl-4-isothiocyanatotolanes (VII). In one embodiment, compounds (VII) comprise 5-20% by weight of 4'-(4"-alkylarylethynyl)-4-isothiocyanatotolanes (VIIa). In another embodiment, compounds (VII) comprise 5-20% by weight of 4'-(4"-alkylsulfanylarylethynyl)-4-isothiocyanatotolanes (VIIb), preferably 6-17% by weight. Examples of preferred compounds (VII) that may be used in the invention are depicted below. The second one starting from top is particularly interesting, as it presents a low melting temperature (crystalline-nematic phase transition temperature: 76.1° C.). The first one and the third one have crystalline-nematic phase transition temperatures of respectively 111.6° C. and 143.4° C.

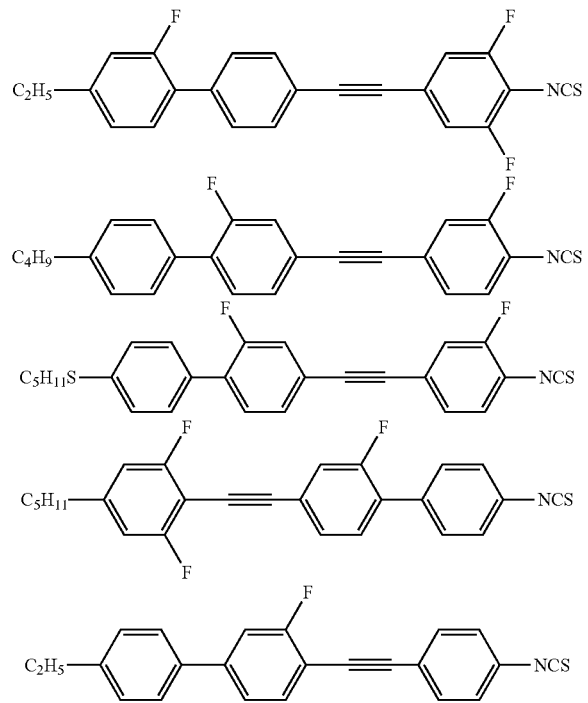

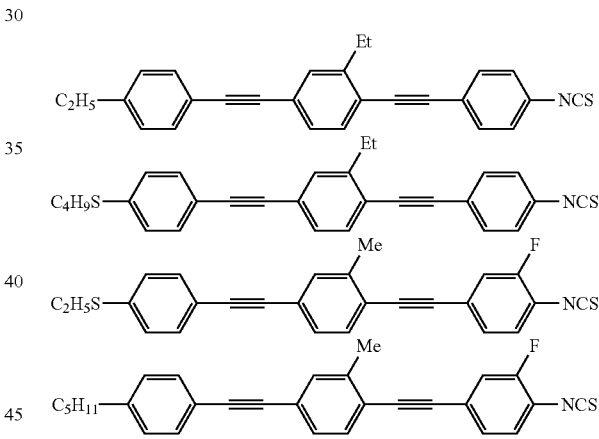

Other compounds of formula (VII) that may be used in the invention are shown below. Their respective crystalline-nematic phase transition temperatures are 136.3° C., 99.2° C. and 125.8° C.:

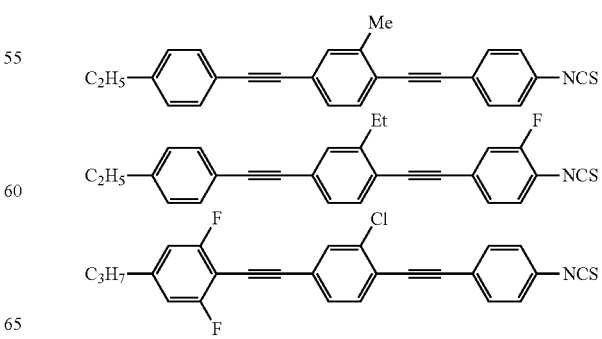

Another compound of formula (V) that may be used in the invention is shown below. Its crystalline-nematic phase transition temperature is 110.6° C.:

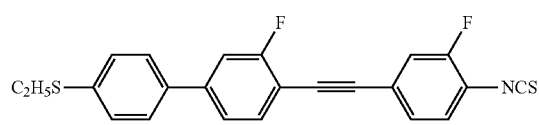

Compounds of formula (VII) can be obtained in a few synthetic steps from readily available precursors, as shown on FIGS. 7-10.

The classes of compounds (V), (VI) and (VII) relate to high birefringent components that are incorporated into the composition in order to increase the birefringence value of the composition to the desired level. In a preferred embodiment, more than 75% by weight of the composition is represented by compounds of formulae (II) to (VIII), preferably more than 80, 85, 90 or 95%, and better 100%.

A preferred composition comprises, based on the total weight of the composition:
- 10-20% by weight of 4'-alkyl-4-isothiocyanatotolanes (II),
- 20-30%, preferably 20-28% by weight of 4'-alkylsulfanyl-4-isothiocyanatotolanes (III),
- 1-10%, preferably 1.5-6% by weight of 4"-alkyl-4-isothiocyanatoterphenyls (IV),
- 20-35%, preferably 20-32% by weight of 4'-aryl-4-isothiocyanatotolanes (V),
- 3-20%, preferably 3-18% by weight of 4'-(4"-isothiocyanatoaryl)-4-alkyltolanes (VI),
- 10-35%, preferably 12-35% by weight of 4'-arylethynyl-4-isothiocyanatotolanes (VII).

According to a more preferred embodiment, the composition comprises:
- 10-20% by weight of 4'-alkyl-4-isothiocyanatotolanes (II),
- 20-30%, preferably 20-28% by weight of 4'-alkylsulfanyl-4-isothiocyanatotolanes (III),
- 1-10%, preferably 1.5-6% by weight of 4"-alkyl-4-isothiocyanatoterphenyls (IV),
- 5-20%, preferably 5-18% by weight of 4'-(4"-alkylaryl)-4-isothiocyanatotolanes (Va),
- 10-20% by weight of 4'-(4"-alkylsulfanylaryl)-4-isothiocyanatotolanes (Vb),
- 3-20%, preferably 3-18% by weight of 4'-(4"-isothiocyanatoaryl)-4-alkyltolanes (VI),
- 5-20% by weight of 4'-(4"-alkylarylethynyl)-4-isothiocyanatotolanes (VIIa),
- 5-20%, preferably 6-17% by weight of 4'-(4"-alkylsulfanylarylethynyl)-4-isothiocyanatotolanes (VIIb).

The birefringent composition may also comprise isothiocyanatobiphenyl compounds of formula Y—Ar$^4$—Ar$^5$—NCS (VIII), in which Y represents an alkylsufanyl R—S group or an alkyl group R, R being such as defined hereabove, Ar$^4$ and Ar$^5$ are identical or different arylene groups, substituted or unsubstituted, the Y and NCS substituents being preferably in para position relative to the triple bond. Including compounds of formula (VIII) in the composition can ensure a better miscibility of heavier structures such as bis-tolane compounds. A preferred compound of formula (VIII) is depicted hereunder and the synthetic route to this compound is shown on FIG. 11. This compound has a melting temperature of 13.4° C.:

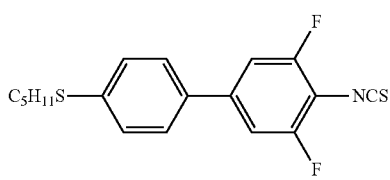

The aryl/phenyl/arylene groups of the compounds present in the composition according to the invention, which preferably comprise an arylisothiocyanate group, may be substituted with various substituents. Among these substituents, isothiocyanate, alkyl and alkylsulfanyl groups have been mentioned. Other substituents that may be present include halogen atoms such as fluorine, chlorine and bromine, preferably fluorine, additional alkyl and/or alkylsulfanyl groups, preferably C1-C4 alkyl groups such as methyl or ethyl, or groups such as alkoxy (for example methoxy), alkoxyalkyl, hydroxyalkyl, amino-alkyl, alkenyl, alkenyloxy, hydroxyl, thiol, amino, nitro, aryloxy, mono-alkylamino, dialkylamino, acyl, carboxyl, alkoxycarbonyl, aryloxycarbonyl, hydroxysulfonyl, alkoxysulfonyl, aryloxysulfonyl, alkylsulfonyl, alkylsulfinyl, cyano, trifluoromethyl, OCF$_3$, OCH F$_2$, tetrazolyl, carbamoyl, alkylcarbamoyl and dialkylcarbamoyl. Alternatively, two adjacent positions in the aromatic ring may be substituted with a methylenedioxy or ethylenedioxy group.

As used herein, "aryl" means an aromatic monovalent carbocyclic radical comprising only one ring (for example a phenyl group) or a plurality of fused rings (for example the naphthyl and anthracenyl groups), which may optionally be substituted with one or more groups.

It has been found that including additional substituents on the aryl/arylene groups of compounds (I) to (VIII), i.e. substituents other than the alkyl, alkylsulfanyl or isothiocyanate groups that may be required by these compounds, allowed to decrease their melting temperatures. In this regard, halogen atoms and C1-C6 alkyl groups, more preferably fluorine atoms and C1-C2 alkyl groups are preferably included, generally in ortho or meta position of the alkyl, alkylsulfanyl, isothiocyanate groups or the triple bonds. Short C1-C2 alkyl groups provided the best results in terms of melting temperature decrease as compared to heavier substituents In one embodiment, compounds having an ortho-fluoro isothiocyanatoaryl group represent 45-75% of the composition total weight. In another embodiment, compounds having an ortho-difluoro isothiocyanatoaryl group represent 10-30% of the composition total weight.

The various components of the birefringent composition according to the invention can be obtained according to or in analogy to methods known per se and described in the literature. Examples of these synthetic routes well known to those skilled in the art are shown on the various figures of the present application. The main reactions involve Suzuki-Miyaura cross-coupling of arylboronic acids or derivatives thereof with aryl halides to create biphenyl structures, Sonogashira cross-coupling of aryl halides with terminal alkynes to create aryl ethynyl structures, such as coupling with 2-methyl 3-butyn-2-ol followed by treatment with a catalytic amount of NaH for removing the acetone protecting group, and a final conversion of aniline precursors to arylisothiocyanates by means of thiophosgene CSCl2.

The composition according to the invention has a high birefringence Δn at 30° C. and 589 nm, i.e., preferably higher than or equal to 0.45, more preferably higher than or equal to 0.47, even better higher than or equal to 0.5.

The composition according to the invention has a low viscosity. For liquid crystals, several viscosities have to be considered. Dynamic viscosity is related to the flow behavior of a liquid crystal composition. Dynamic viscosity should be low so that the composition can be poured in optical elements, including thin layers. For liquid crystals, the transition speed between two different ordered states, from nematic to isotropic state or from isotropic to nematic state, is linked to intermolecular rearrangements. These rearrangements may be characterized by an intrinsic viscosity, at a molecular level. This intrinsic viscosity should be low to have quick response of liquid crystal compositions to electric stimuli.

The liquid crystal composition preferably has a nematic-isotropic phase transition temperature ranging from 90 to 130° C., more preferably from 90 to 120° C. To achieve this result, the composition preferably includes compounds having a melting temperature lower than or equal to 100° C., preferably lower than or equal b 90° C., more preferably lower than or equal to 80° C. Additionally, the composition does preferably not comprise compounds having a crystalline-nematic phase transition temperature higher than 140° C., or such compounds may be present in low amounts, typically less than 5% by weight. Such compounds have a limited usefulness as components of nematic mixtures.

A person skilled in the art knows very well how to assess the liquid-crystal phase/isotropic phase transition temperature of the composition. For example, the nematic-isotropic transition temperature may be determined on a polarization microscope equipped with a heating unit and mounted in a cross polarized way. Below transition temperature, the composition shows at least partially some birefringence as the liquid crystals are at least partially in nematic phase, while above the transition temperature, the birefringence disappears and the image seen through the microscope is black.

The optical article according to the invention can comprise a secondary composition that does not disturb the liquid crystal phase, mixed with the above described birefringent liquid crystal composition ("primary composition"), said secondary composition comprising additives that are known to those of ordinary skill in the art and described in the literature (for example in standard works, such as the Handbook of Liquid Crystals, Wiley VCH, 2nd Edition, 2014). For example, it is possible to add solvents, pleochroic dyes, substances to modify the dielectric anisotropy, viscosity and/or the orientation of the nematic phases, or chiral dopants in said secondary composition.

The secondary composition can also comprise other classes of liquid crystals than those described above, preferably nematic ones, such as low molecular weight liquid crystalline compounds selected from azoxy-benzenes, benzylidene-anilines, biphenyls and/or terphenyls other than those previously described, aryl or cyclohexyl benzoates, aryl or cyclohexyl esters of cyclohehexane-carboxylic acid, aryl or cyclohexyl esters of cyclohexylbenzoic acid, aryl or cyclohexyl esters of cyclohexylcyclohexane carboxylic acid, cyclohexylaryl esters of benzoic acid, of cyclohexane carboxylic acid and of cyclohexylcyclohexane carboxylic acid, arylcyclohexanes, cyclohexylbiphenyls, arylcyclohexylcyclohexanes, cyclohexylcyclohexanes, cyclohexylcyclohexenes, cyclohexylcyclohexyl-cyclohexenes, 1,4-bis-cyclohexylbenzenes, 4,4'-bis-cyclohexylbiphenyls, aryl- or cyclohexylpyrimidines, aryl- or cyclohexylpyridines, aryl- or cyclohexylpyridazines, aryl- or cyclohexyldioxanes, aryl- or cyclohexyl-1,3-dithianes, 1,2-di-arylethanes, 1,2-dicyclohexylethanes, 1-aryl-2-cyclohexylethanes, 1-cyclohexyl-2-(4-arylcyclohexyl)ethanes, 1-cyclohexyl-2-biarylethanes, 1-aryl-2-cyclohexyl-arylethanes, optionally halogenated stilbenes, benzyl aryl ether, tolanes, and substituted cinnamic acids and further classes of nematic or nematogenic substances.

Numerous nematic liquid crystals are commercially available and may be present in the secondary composition, for example nematic liquid crystals commercialized by Merck under the designations BL036, BL037, BL038, BL087, BL093, BL111, TL213, TL216, E7, E63, MLC-6621-000, MLC-6621-100, ZU-5049-000 and ZU-5049-100.

The secondary composition is not necessarily present, but when it is, it preferably represents 15% by weight or less relative to the weight of the primary composition, more preferably 10% by weight or less, and even more preferably 5% by weight or less.

The preparation of the composition according to the invention is carried out by conventional methods, for example by mixing solutions of the components in an organic solvent, like e.g. acetone, chloroform or methanol, and removing the solvent after mixing, e.g. by distillation.

The components employed when formulating the mixture must be carefully selected in order to obtain the desired temperature range of the nematic phase with optimal mesomorphic properties such as birefringence ($\Delta n$) and miscibility of the various components to create a stable nematic system. To this end, the formulation should include suitable amounts of both nematogene compounds such as compounds of formula (V) to (VII), and low melting temperature compounds such as compounds of formula (II) or (III) in order to obtain a satisfactory level of miscibility and solubility of the whole set of compounds included in the birefringent composition.

One should also avoid using compounds showing smectic phase in broad temperature range, which is not suitable for nematic mixture formulation. Strong smectogenity typically excludes liquid crystal compounds from room temperature applications. Suppressing the occurrence of a smectic phase on an individual compound having an aryl isothiocyanate group can be performed, e.g., by introducing one or two fluorine atoms on the terminal benzene ring in ortho position to the NCS group.

The inventive composition can be used in liquid crystal media and liquid crystal displays, such as super-twisted nematic display (STN), twisted nematic display (TN), temperature compensation, guest-host and scattering type displays. They are particularly useful in high $\Delta n$ liquid crystal media and lenses or displays using such media, especially polymer dispersed liquid crystals (PDLCs) type displays.

In this regard, the optical article according to the invention is preferably an optical lens such as an ophthalmic lens, an auto-supported film, an optical phase retarder, or a display device.

The following examples illustrate the present invention in a more detailed, but non-limiting manner.

EXAMPLES

Five liquid crystal compositions comprising 9-15 compounds were prepared. The different compounds employed were prepared according to the reaction schemes shown in the figures and their structures are presented in the following tables, as well as the thermal and optical properties of the compositions. Stable birefringent compositions in nematic liquid crystal state around room temperature have been obtained and their nematic properties have been characterized.

Birefringence has been measured using two independent techniques. The first technique was multiwavelength Abbe refractometer (Atago DR-M4) using the extrapolation from two concentrations of reference Demus esters mixture. The second technique was direct measurement using Metricon prism coupler with tri-laser system. Measurements from the two described techniques were consistent and have been compared for the same wavelength of 589 nm.

| Example | 1 | wt % |
|---|---|---|
| Composition (wt. %) | 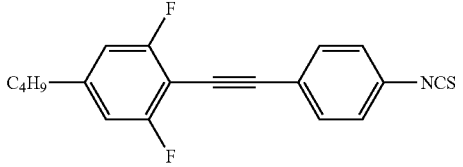 | 17.8 |
| | 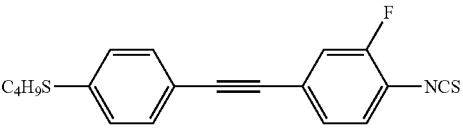 | 12.0 |
| | 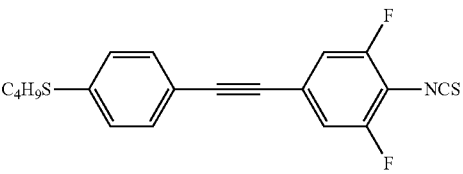 | 12.8 |
| | 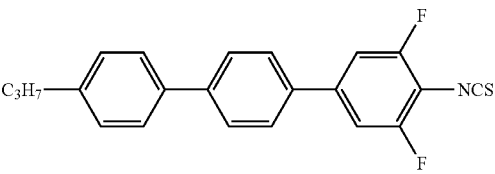 | 3.9 |
| | 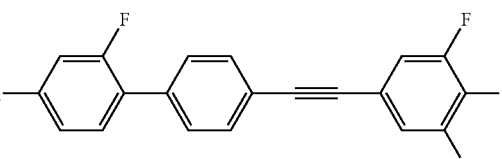 | 7.2 |
| | 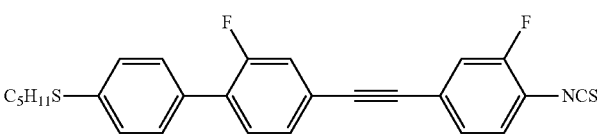 | 16.0 |
| | 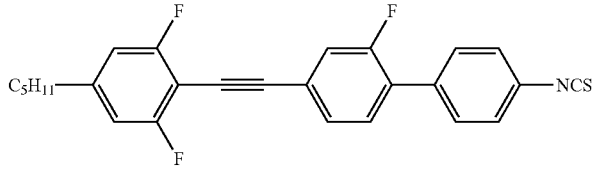 | 15.4 |
| | 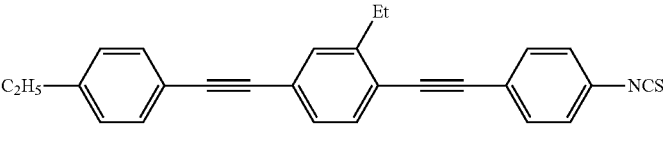 | 6.9 |
| | 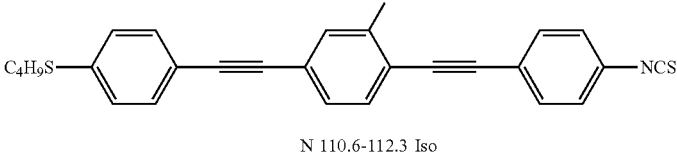 | 8.0 |
| Phase transition temperatures [° C.] | N 110.6-112.3 Iso | |
| Birefringence Δn (30° C.-589 nm) | 0.47 | |

| Example | 2 | wt % |
|---|---|---|
| Composition (wt. %) | 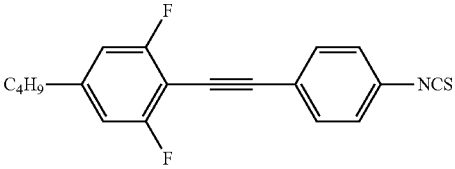 | 16.6 |
| | 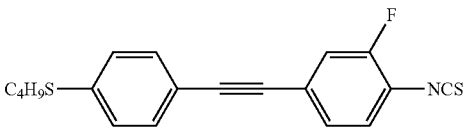 | 11.2 |
| | 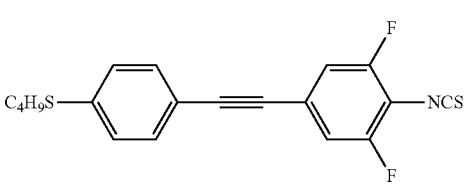 | 12.0 |
| | 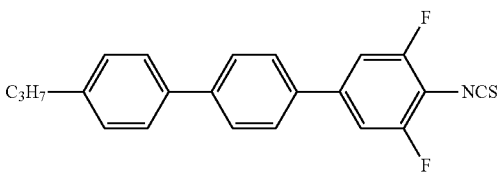 | 3.7 |
| | 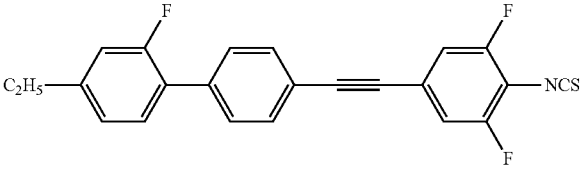 | 6.7 |
| | 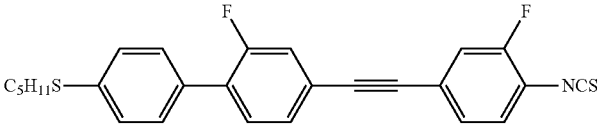 | 15.0 |
| | 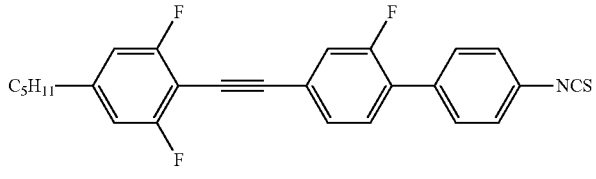 | 14.4 |
| | 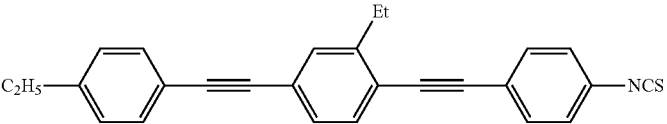 | 6.5 |
| | 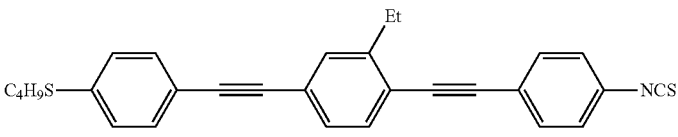 | 11.7 |

|  |  | 2.2 |
|---|---|---|

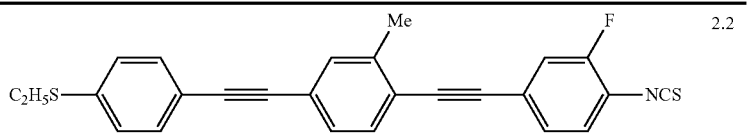

Phase transition temperatures [° C.]  
Birefringence Δn  
(30° C.-589 nm)

N + Cr 44.0 N 114.5-116.0 Iso

| Example | 3 | wt % |
|---|---|---|
| Composition (wt. %) | $C_4H_9$—⟨F,F-benzene⟩—C≡C—⟨benzene⟩—NCS | 5.2 |
| | $C_3H_7$—⟨benzene⟩—C≡C—⟨F-benzene⟩—NCS | 7.3 |
| | $C_2H_5S$—⟨benzene⟩—C≡C—⟨F-benzene⟩—NCS | 1.7 |
| | $C_4H_9S$—⟨benzene⟩—C≡C—⟨F-benzene⟩—NCS | 9.5 |
| | $C_4H_9S$—⟨benzene⟩—C≡C—⟨F,F-benzene⟩—NCS | 11.7 |
| | $C_3H_7$—⟨benzene⟩—⟨benzene⟩—⟨F,F-benzene⟩—NCS | 3.7 |
| | $C_2H_5$—⟨F-benzene⟩—⟨benzene⟩—C≡C—⟨F,F-benzene⟩—NCS | 7.4 |
| | $C_4H_9$—⟨benzene⟩—⟨F-benzene⟩—C≡C—⟨F-benzene⟩—NCS | 8.4 |

| | | |
|---|---|---|
| | 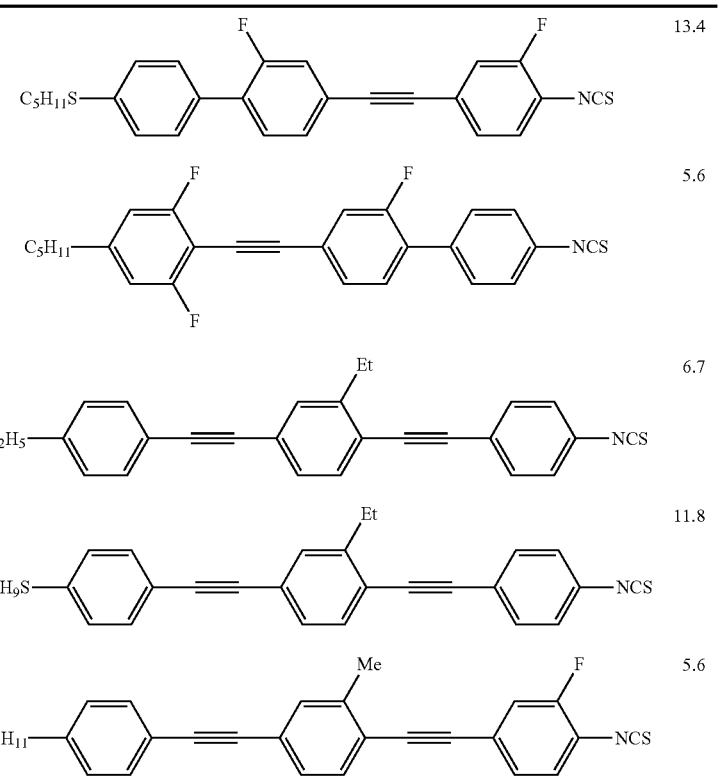 C5H11S—⌬—⌬(F)—≡—⌬(F)—NCS | 13.4 |
| | C5H11—⌬(F,F)—≡—⌬(F)—⌬—NCS | 5.6 |
| | C2H5—⌬—≡—⌬(Et)—≡—⌬—NCS | 6.7 |
| | C4H9S—⌬—≡—⌬(Et)—≡—⌬—NCS | 11.8 |
| | C5H11—⌬—≡—⌬(Me)—≡—⌬(F)—NCS | 5.6 |
| Phase transition temperatures [° C.] | N 122.2-124.6 Iso | |
| Birefringence Δn (30° C.-589 nm) | 0.49 | |
| Example | 4 | wt % |
|---|---|---|
| Composition (wt. %) | C4H9—⌬(F,F)—≡—⌬—NCS | 4.3 |
| | H3C—⌬—≡—⌬—NCS | 1.6 |
| | C3H7—⌬—≡—⌬(F)—NCS | 7.7 |
| | C2H5S—⌬—≡—⌬(F)—NCS | 1.7 |
| | C4H9S—⌬—≡—⌬(F)—NCS | 10.7 |

-continued
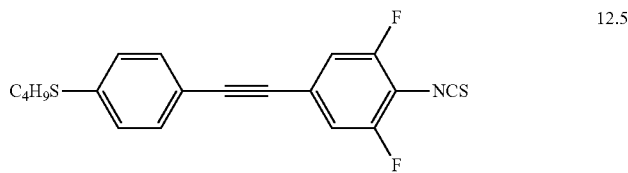 12.5
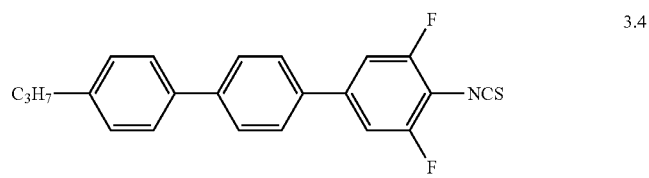 3.4
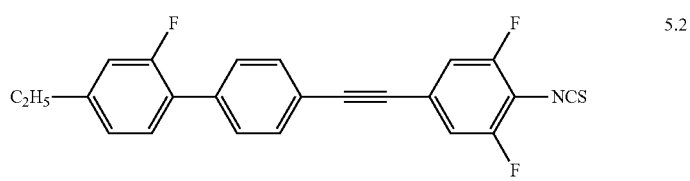 5.2
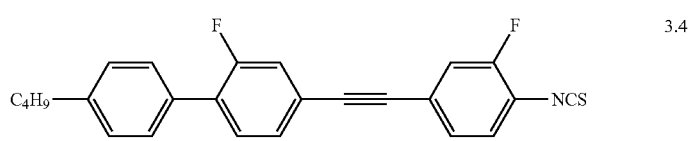 3.4
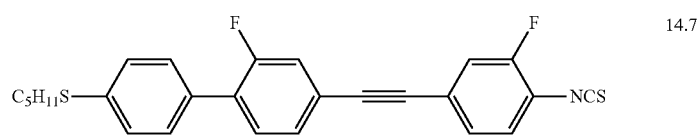 14.7
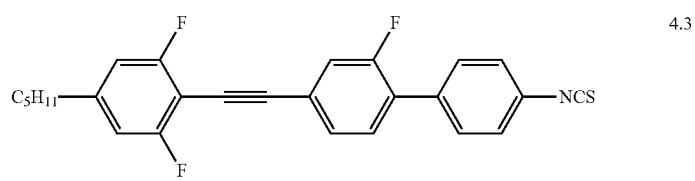 4.3
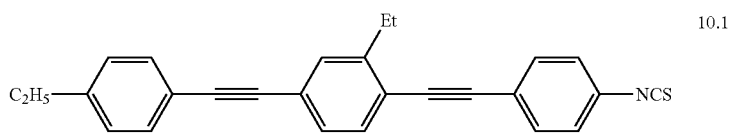 10.1
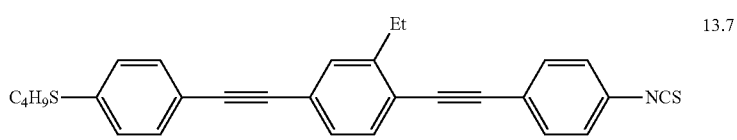 13.7
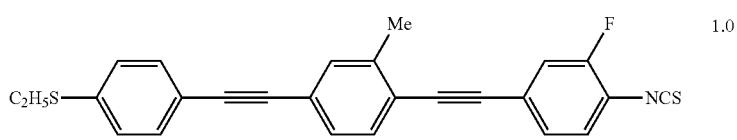 1.0

-continued
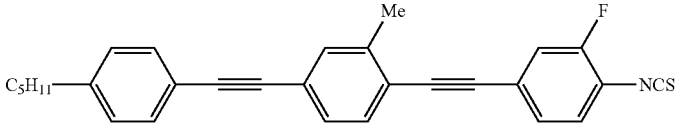 7.3
Phase transition temperatures [° C.]  N 116.4-119.2 Iso
Birefringence Δn
(30° C.-589 nm)
| Example | 5 | wt % |
|---|---|---|
| Composition (wt. %) | 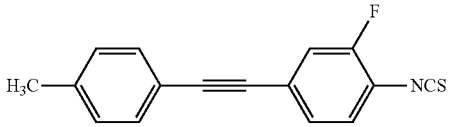 | 5.4 |
| | 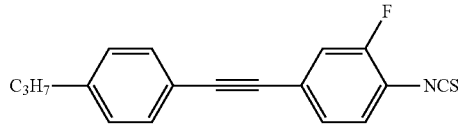 | 7.3 |
| | 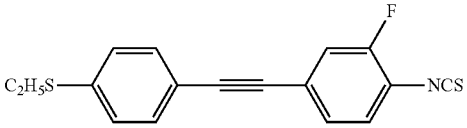 | 1.7 |
| | 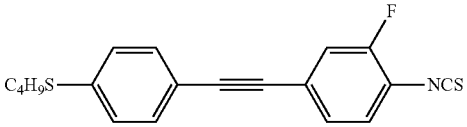 | 9.4 |
| | 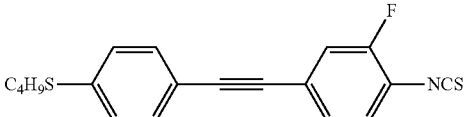 | 11.3 |
| | 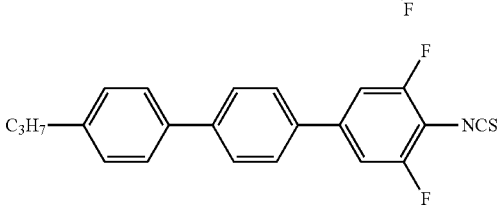 | 3.6 |
| | 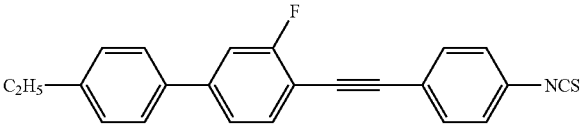 | 7.5 |
| | 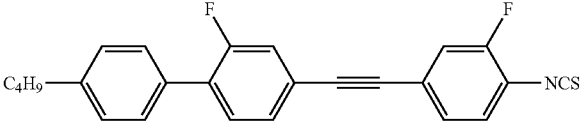 | 8.6 |
| | 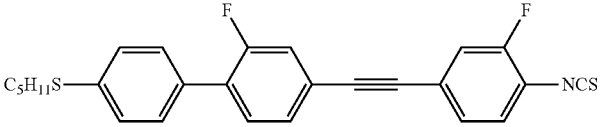 | 13.3 |

-continued

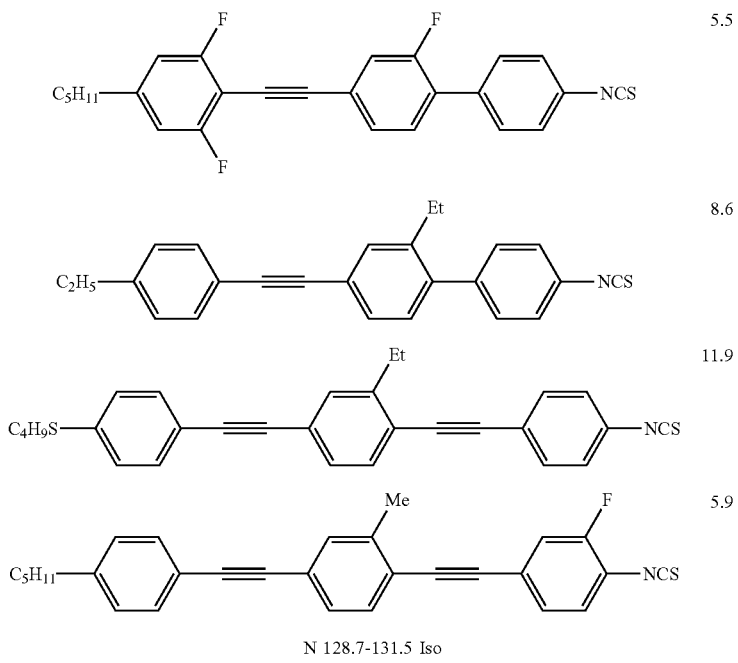

| | | |
|---|---|---|
| | | 5.5 |
| | | 8.6 |
| | | 11.9 |
| | | 5.9 |

| Phase transition temperatures [° C.] | N 128.7-131.5 Iso |
| --- | --- |
| Birefringence Δn (30° C.-589 nm) | 0.54 |

N: Nematic.
Cr: Crystalline.
Iso: Isotropic.

The invention claimed is:

1. An optical article comprising
a birefringent liquid crystal composition, wherein said composition comprises one or more compounds and simultaneously satisfies the following two conditions:
a) among all the compounds present in the composition, compounds of formula (I):

R—S—Z$^1$-A-Z$^2$—NCS    (I)

wherein:
R is a substituted or unsubstituted, linear or branched alkyl group, Z$^1$ and Z$^2$ are aryl groups, and A is an ethynyl group, an arylethynyl group or an ethynylarylethynyl group,
are present in the composition in such an amount that they represent more than 30% by weight, based on the total weight of the composition,
b) at least one of the compounds present in the composition is
a 4'-aryl-4-isothiocyanatotolane, a 4'-(4"-isothiocyanatoaryl)-4-alkyltolane, or a 4'-arylethynyl-4-isothiocyanatotolane.

2. The optical article according to claim 1, wherein R comprises from 1 to 8 carbon atoms.

3. The optical article according to claim 1, wherein the composition further satisfies the following condition:
among all the compounds present in the composition compounds having an alkylsulfanylaryl group are present in, the composition in such an amount that they represent 45-60% by weight, based on the total weight of the composition.

4. The optical article according to claim 1, wherein the composition comprises, as the compounds of formula (I):

20-30% by weight of 4-'-alkylsulfanyl-4-isothiocyanatotolanes,
10-20% by weight of 4'-(4"-alkylsulfanylaryl)-4-isothiocyanatotolanes, and
5-20% by weight of 4'-(4"-alkylsulfanylarylethynyl)-4-isothiocyanatotolanes, based on the total weight of the composition.

5. The optical article according to claim 1, wherein the composition further satisfies the following condition:
among all the compounds present in the composition, compounds having a tolane group are present in the composition in such an amount that they represent more than 90% by weight, based on the total weight of the composition.

6. The optical article according to claim 1, wherein the composition further satisfies the following condition:
among all the compounds present in the composition, compounds having 4-aryl-tolane group bearing an isothiocyanate group are present in such an amount that they represent 25-45 z by weight, based on the total weight of the composition.

7. The optical article according to claim 1, wherein the composition further satisfies the following condition:
among all the compounds present in the composition, compounds having an ortho-fluoro isothiocyanatoaryl group are present in the composition in such an amount that they represent 45-75 by weight, based on the total weight of the composition.

8. The optical article according to claim 1, wherein the composition further satisfies the following condition:
among all the compounds present in the composition, compounds having an ortho-difluoro isothiocyanatoaryl group are present in such an amount that they represent 10-30% by weight, based on the total weight of the composition.

9. The optical article according to claim 1, wherein the composition further satisfies the following conditions simultaneously:

among all the compounds present in the composition, 4'alkyl-4-isothiocyanatotolanes are present in the composition in such an amount that they represent 10-20% by weight, based on the total weight of the composition, among all the compounds present in the composition, 4'-alkylsulfanyl-4-isothiocyanatotolanes are present in the composition in such an amount that they represent 20-30% by weight, based on the total weight of the composition, among all the compounds present in the composition, 4"-alkyl-4-isothiocyanatoterphenyls are present in the composition in such an amount that they represent 1-10% by weight, based on the total weight of the composition, among all the compounds present in the composition, 4'-aryl-4-isothiocyanatotolanes are present in the composition in such an amount that they represent 20-35% by weight, based on the total weight of the composition, among all the compounds present in the composition, 4'-(4"-isothiocyanatoaryl)-4-alkyltolanes are present in the composition in such an amount that they represent 3-20% by weight, based on the total weight of the composition, and among all the compounds present in the composition, 4'-arylethynyl-4-isothiocyanatotolanes are present in the composition in such an amount that they represent 10-35% by weight, based on the total weight of the composition.

10. The optical article according to claim 9, wherein the 4'-aryl-4-isothiocyanatotolanes comprise 5-20% by weight of 4'-(4"-alkylaryl)-4-isothiocyanatotolanes, based on the total weight of the composition.

11. The optical article according to claim 9, wherein the 4'-arylethynyl-4-isothiocyanatotolanes comprise 5-20% by weight of 4'-(4"-alkylarylethynyl)-4-isothiocyanatotolanes, based on the total weight of the composition.

12. The optical article according to claim 1, wherein the composition further satisfies the following conditions simultaneously:

among all the compounds present in the composition, 10-20% by weight of 4"-alkyl-4-isothiocyanatotolanes are present in the composition in such an amount that they represent 10-20% by weight, based on the total weight of the composition, among all the compounds present in the composition, 4'-alkylsulfanyl-4-isothiocyanatotolanes are present in the composition in such an amount that they represent 20-30% by weight, based on the total weight of the composition, among all the compounds present in the composition 4"-alkyl-4-isothiocyanatoterphenyls are present in the composition in such an amount that they represent 1-10% by weight, based on the total weight of the composition, among all the compounds present in the composition, 4'(4"-alkylsulfanylaryl)-4-isothiocyanatotolanes are present in the composition in such an amount that they represent 10-20% by weight, based on the total weight of the composition, among all the compounds present in the composition, 4'-(4"-alkylaryl)-4-isothiocyanatotolanes are present in the composition in such an amount that they represent 5-20% by weight, based on the total weight of the composition, among all the compounds present in the composition, 4'-(4"-isothiocyanatoaryl)-4-alkyltolanes are present in the composition in such an amount that they represent 3-2.0% by weight, based on the total weight of the composition, among all the compounds present in the composition, 4'-(4"-alkylarylethynyl)-4-isothiocyanatotolanes are present in the composition in such an amount that they represent 5-20% by weight, based on the total weight of the composition, and among all the compounds present in the composition, 4'-(4"-alkylsulfanylarylethynyl)-4-isothiocyanatotolanes are present in the composition in such an amount that they represent 5-20% by weight, based on the total weight of the composition.

13. The optical article according to claim 1, wherein the alkyl groups are C1-C6 linear alkyl groups.

14. The optical article according to claim 1, wherein the composition has a birefringence Δn at 30° C. and 589 nm higher than or equal to 0.45.

15. The optical article according to claim 1, wherein the composition has a nematic-isotropic phase transition temperature ranging from 90 to 130° C.

16. The optical article according to claim 1, wherein the optical article is an ophthalmic lens.

17. The optical article according to claim 1, wherein the composition further satisfies the following condition:

among all the compounds present in the composition, compounds having an alkylsulfanylaryl group are present in the composition in such an amount that they represent 40-70% by weight, based on the total weight of the composition.

18. The optical article according to claim 1, wherein the optical article is an optical lens, an auto-supported film, an optical phase retarder, or a display device.

19. The optical article according to claim 4, wherein the optical article is an optical lens, an auto-supported film, an optical phase retarder, or a display device.

* * * * *